UNITED STATES PATENT OFFICE.

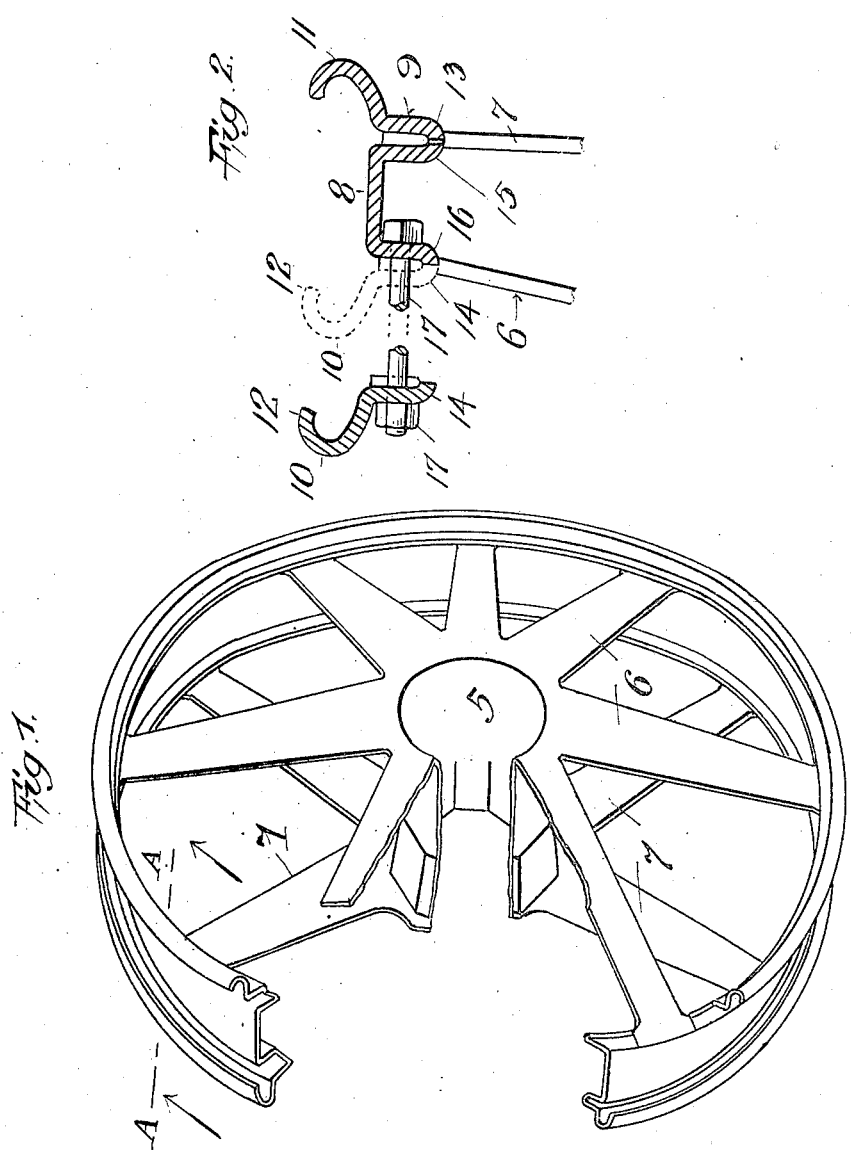
J. LEDWINKA.
PRESSED STEEL WHEEL.
APPLICATION FILED FEB. 21, 1917.
1,299,360. Patented Apr. 1, 1919.
Inventor
Joseph Ledwinka
by his atty Samuel E. Darby

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

PRESSED-STEEL WHEEL.

1,299,360.     Specification of Letters Patent.     Patented Apr. 1, 1919.

Application filed February 21, 1917. Serial No. 150,086.

*To all whom it may concern:*

Be it known that I, JOSEPH LEDWINKA, a citizen of the United States, residing at Philadelphia, in the county of Philadelphia, State of Pennsylvania, have made a certain new and useful Invention in Pressed-Steel Wheels, of which the following is a specification.

This invention relates to pressed steel wheels, and particularly to the tire structure of such wheels.

The object of the invention is to provide a structure of pressed steel wheel which is simple, efficient and economical to manufacture, and wherein the spokes are formed integral with the hub sleeve and are connected to a tire receiving rim which permits the tire to be demounted from the rim.

The invention consists substantially in the construction, combination, location and relative arrangement of parts, all as will be more fully hereinafter set forth, as shown in the accompanying drawing and finally pointed out in the appended claims.

In the drawing:—

Figure 1 is a view in perspective with parts broken out and in section of a pressed steel wheel showing the application of a rim structure thereto in accordance with the principles of my invention.

Fig. 2 is a detail view in cross section through the rim on the line A, A, Fig. 1.

The problem of employing a rim structure for wheels wherein the wheel tire is readily demountable presents comparatively little difficulty in the wheels of ordinary structure such as the common form of wood spoked and wire spoked wheels, where the outer ends of the spokes carry a felly ring or band upon which the rim with a detachable flange is mounted and secured. In the case of a pressed steel wheel, however, the difficulties are very greatly increased, particularly where the spokes are integral with the hub ring body of the wheel. Moreover, in the ordinary wood spoked and wire spoked wheels the provision of a felly ring or band is usually necessary in the case of a demountable tire structure of rim, and the provision of such a ring or band adds very materially to the cost of manufacture as well as to the weight of the wheel.

It is among the special purposes of my present invention to provide a rim structure for pressed steel wheels of the nature referred to wherein the tire is readily and easily demountable, wherein a felly band or ring, when desired, may be omitted, and wherein the spokes are integral with the hub sleeve or body portion of the wheel.

In carrying out my invention I employ a wheel in which the hub sleeve or body portion thereof and the spokes are stamped and pressed integrally with each other from a sheet or plate of sheet steel, a set of spokes being formed at each end of the hub sleeve. I also employ a rim composed of a central portion and tire engaging flange portions, one of the flange portions being detachable while the spokes are integrally or otherwise suitably secured to the central portion of the rim.

Referring to the drawing, the hub sleeve portion 5 of the pressed steel wheel, is of tubular form. The spokes, indicated at 6 and 7, are formed integrally with the respectively opposite ends of the tubular sleeve 5.

The rim is formed of the sections or portions 8, 9, 10. The section 8 is a ring stamping formed of channel shape in cross section and constitutes the central section or portion of the rim. The sections 9 and 10 are of annular ring shape formed of stampings and having the curved tire engaging flanges 11, 12, respectively, and the plane flange portions 13, 14, which are designed to fit against the side flanges 15, 16, of the channel shaped central portion of the rim. One set of the stamped out spokes, as 7, have their outer ends positioned between the flanges 13, 15, of the ring 9 and center portion 8 of the rim, and these parts are then welded or otherwise secured together, and when so united form a single unit. The outer ends of the spokes 6, are, in like manner, welded or otherwise secured to the flange 16 of the center portion 8 of the rim to form when so united a portion of this single unit. The ring portion 10, however, is detachably connected to the flange 16, as, for example, by the nuts and bolts indicated at 17.

By the structure above described I am enabled to produce an exceedingly strong and economical pressed steel wheel wherein the hub sleeve of the wheel and the spokes are stamped out of a single sheet of steel plate, wherein the outer ends of the spokes are integrally or rigidly secured to the central and inner flange portions or sections of the rim, and wherein the outer flange portion of the rim is detachable to permit the ready and easy demounting of the tire.

Having now set forth the objects and nature of my invention, and a construction embodying the principles thereof, what I claim as new and useful and of my own invention, and desire to secure by Letters Patent is:

1. A pressed steel wheel having a central tubular portion forming the hub sleeve, and spoke portions formed integrally with the ends of said tubular portion, and an annular rim structure including a member channel shaped in cross section to the outer surfaces of the side portions of which the outer ends of the spoke portions are secured, and independent tire engaging ring members applied against the outer sides of the spoke ends, one of said ring members being detachable.

2. The combination with a pressed steel wheel structure including a tubular sleeve and spoke portions integral with the ends of said sleeve, of a sectional rim structure including a central annular member, channel shaped, in cross section, and independent tire engaging rings, the ends of the spokes being secured between the flanges of the channel member and independent tire engaging rings, one of the tire engaging rings being detachable.

3. The combination with a pressed steel wheel structure including a tubular sleeve and spoke portions integral with the ends thereof, of an annular rim structure including a central channel shaped member, and independent tire engaging rings secured to the outer surfaces of the side portions of said channel member, the ends of the spokes being secured between said channel member sides and the tire engaging rings.

4. The combination with a pressed steel wheel structure including a tubular sleeve and spoke portions formed integrally therewith, of an annular rim structure including a central channel member and independent tire engaging rings secured to the outer surfaces of the sides of said channel member, the ends of the spokes being secured between said channel member and the tire engaging rings, one of said tire engaging rings being detachable.

5. The combination with a pressed steel wheel structure including a tubular sleeve and a set of spokes formed integral therewith at the respective ends thereof, of an annular rim structure including a central member, channel shaped in cross section, and independent tire engaging rings, the free ends of said sets of spokes being respectively secured against the outer sides of the channel member and between the same, and adjacent tire engaging ring, one of said tire engaging rings being detachable.

6. The combination with a pressed steel wheel including a central tubular sleeve having integral spokes at the respective ends thereof, of an annular rim structure including a central channel shaped member, and independent tire retaining rings applied to the outer surface of each side flange of the central member, one of said retaining rings being detachable, the outer free ends of the respective sets of spokes being secured to the side flanges of the central member, and between the same and the coöperating retaining ring.

7. The combination with a pressed steel wheel having a tubular sleeve portion with integral spokes at its ends, and a rim structure including a central ring channel-shaped in cross section, and independent tire retaining rings, the free ends of said spokes, the side portions of the central ring, and one of the tire retaining rings being welded together into an integral unitary structure, the other of said tire retaining rings being detachable to permit the tire to be demounted.

In testimony whereof I have hereunto set my hand in the presence of the subscribing witnesses, on this 15th day of February A. D., 1917.

JOSEPH LEDWINKA.

Witnesses:
J. MARMION,
A. H. BUXBAUM.